Sept. 14, 1926.  
E. O'HARA  
1,599,917  
ATTACHMENT FOR STEEL DIE AND PLATE PRESSES  
Filed April 16, 1926   2 Sheets-Sheet 2
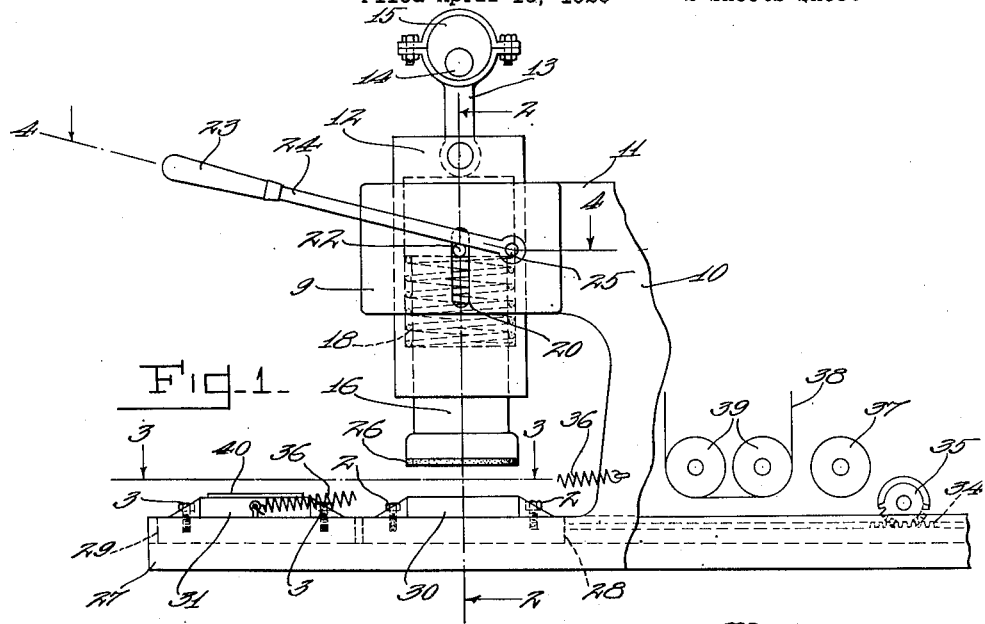

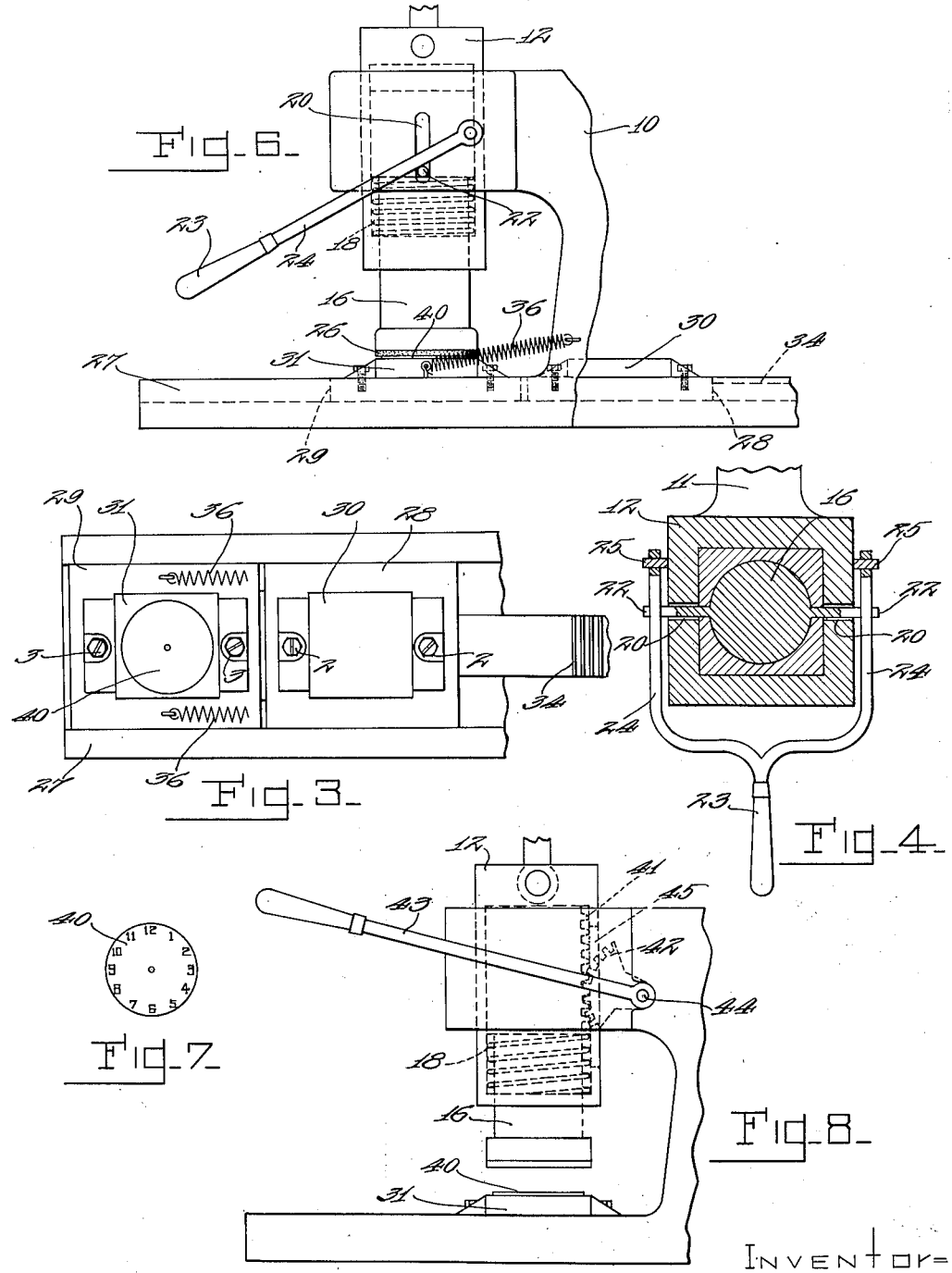

Patented Sept. 14, 1926.

1,599,917

UNITED STATES PATENT OFFICE.

ELIOT O'HARA, OF WALTHAM, MASSACHUSETTS.

ATTACHMENT FOR STEEL DIE AND PLATE PRESSES.

Application filed April 16, 1926. Serial No. 102,511.

The invention relates to a new and useful improvement in means for printing or embossing on frangible articles such as glass, china, porcelain, enamel or other brittle or frangible articles. It is especially intended for attachment to an automatic steel die and plate press, but is not necessarily limited to use with an automatic press.

The ordinary steel die and plate press is a machine which is intended for printing or embossing visiting cards and the like from an intaglio steel or copper die plate for engraving, but it is not adapted for printing or embossing on glass, enamel or other frangible articles. The object of the present invention is to provide means for printing or embossing on frangible articles as above mentioned.

In carrying out the present invention there are provided a vertically movable hollow plunger within which is a vertically movable piston and carrying on its lower end a pad of gelatin or other suitable pad having a surface adapted to take up ink from a steel or other metal die, the plunger and piston being connected in such manner that the plunger and piston are normally moved together and means are also provided whereby the piston may be moved independently of the plunger. Horizontally movable carriers are provided one of which carries a die on which is cut the design to be printed and the other of which carries a holder for the work on which the design is to be printed, the carriers being movable in such manner as to alternately bring the die and the work holder underneath the piston. Means are provided whereby the die will be inked when it is out from under the piston and when the work holder is beneath the piston, then the carrier will be moved so as to bring the die under the piston and the work holder out from under the piston, then the plunger and piston will descend to bring the pad carried by the piston into contact with the die to take up the ink, then the plunger and piston will rise, and the carriers will be actuated to move the die out from under the piston and to bring the work holder under the piston. Means are provided whereby when the work holder is under the piston the piston may be moved downward without moving the plunger thereby bringing the printing pad into contact with the work to print the design on the work, then the piston will be raised and the die will be moved to carry the work holder out from beneath the piston and bring the die back under the piston, the die having been re-inked before it returns to position beneath the piston.

The invention will be fully understood from the following description when taken in connection with the accompanying drawings and the novel features thereof will be pointed out and clearly defined in the claims at the close of this specification.

In the drawings:

Fig. 1 is a fragmentary view in side elevation of a machine embodying the invention showing the piston and plunger in elevated position, and the printing die beneath the piston.

Fig. 2 is a section on line 2—2, Fig. 1.

Fig. 3 is a section on line 3—3, Fig. 1.

Fig. 4 is a section on line 4—4, Fig. 1.

Fig. 5 is a view similar to Fig. 1, but showing the parts in a different position, the plunger and piston being shown down to bring the print pad in contact with the inking die.

Fig. 6 is a view showing the piston in downward position in contact with the work holder after the plunger and piston have been raised from their previous downward position and the die has been moved out from under the plunger and the work holder has been brought under the plunger.

Fig. 7 is a detail plan view of the work after it has been printed.

Fig. 8 shows a modified means for manually operating the piston.

Referring to the drawings:

There is shown at 10 a frame or casting to hold the working parts, said frame having an overhanging arm 11 provided with a head 9 formed with a guide opening through which a vertically reciprocable plunger 12 extends. Said plunger is connected with any suitable mechanism for giving it vertical reciprocation. As shown in the drawings, it is connected by a crank 13 and crank pin 14 with an eccentric 15.

The said plunger 12 is hollow and a piston 16 is mounted within the hollow interior of the plunger in such manner as to be movable with the plunger and independently of the plunger. In order that the piston may normally move with the plunger it is formed with a shoulder 17 seated upon a coil spring 18 which surrounds the reduced lower part of the piston below the shoulder, one end of said spring abutting against said shoulder and the other end of the spring resting upon a shoulder 19 within the plunger.

At each rotation of the eccentric 15 the plunger 12 will be raised and lowered carrying the piston with it. Means are provided whereby the piston may be depressed independently of the plunger while the plunger is in its uppermost position. To this end the head 9 and the plunger 12 are formed respectively with vertically elongated slots 20, 21 in alinement with each other. The piston 16 is provided with two oppositely extending pins 22, 22 projecting from the enlarged upper end of the piston, said pins extending through the slots 20, 21 above the spring 18. A bifurcated lever 23 has two arms 24, 24 which straddle the head 9 and are pivotally connected at their ends with pivots 25 projecting from opposite sides of the head 9. Said arms bear upon the upper sides of the pins 22, 22 respectively. By pressing down on the lever 23 the piston 16 may be depressed independently of the plunger 12 by reason of the arms 24, 24 engaging with the pins 22, 22 which are rigidly connected with the piston. This lever may be operated by hand and when released from downward pressure the spring 18 will again raise the piston.

Secured to the lower end of the piston is a pad 26 of suitable elastic material to form a printing surface adapted to take up ink from a die and to transfer the ink to the work to print the design when the work is brought into proper position under the piston and the printing pad is pressed against the work.

This printing pad is preferably composed of gelatin but any suitable substitute may be employed.

Mounted in a guide or track groove in a bed 27 which forms a part of the frame are two carriers 28 and 29 respectively, said carriers having mounted thereon respectively a metal die 30 and a work holder 31. The die 30 is preferably of steel or copper or may be of any suitable metal sufficiently hard to have the design which is to be printed cut therein in intaglio so as to receive the ink which is to be taken up by the printing pad 26. The die and the work holder may be held in place by any suitable means as for instance clamps 2 for the die and similar clamps 3 for the work holder.

The die carrier is connected with suitable mechanism for intermittently reciprocating it in its grooved track. As shown in the drawings, the die carrier 28 is connected with a rack 34 which is engaged by a pinion 35. Suitable mechanism may be provided for rotating said pinion 35 intermittently in opposite directions so as to give a reciprocating intermittent movement to the carrier. It is not deemed necessary to show such mechanism as it will be understood. It may be connected with the mechanism which actuates the eccentric 15 and timed so that the die carrier will have its movement in proper relation to the reciprocating movement of the plunger.

A spring 36 is connected with the work carrier 29 which normally tends to pull the carrier 29 to the right as viewed in the drawings so that when the die carrier is moved to the right out from under the plunger, the spring 36 will actuate the work holder carrier 29 to follow the die carrier in its movement toward the right and bring the work holder in alinement beneath the piston. The work carrier however cannot move to the right until the die carrier moves. When the pinion 35 rotates in a direction to move the die carrier toward the left again after its right hand movement and after the work has been printed, the die carrier will by its engagement with the right hand end of the work holder carrier move the work holder carrier back again toward the left and put tension in the spring 36.

An inking roller 37 is located just above the path of movement of the die 30 so that when the die is moved to the right out from under the piston its upper surface will be engaged by the inking roller. Located just above the path of movement of the die between the inking roller and the piston is a suitable wiping mechanism, said wiping mechanism shown in the drawings consisting of a strip of paper 38 or other suitable material which passes under guide rolls 39 so that when the die, after being inked, moves back to operative position beneath the piston the said wiper 38 will lightly wipe over the surface of the die to move the surplus ink, that is, the ink which is not deposited in the depressions formed by the intaglio design.

There is shown at 40 the work which is to be printed upon, consisting of a dial mounted upon the work holder. Any suitable and well known form of mechanism may be employed to actuate the eccentric 15 and the pinion 35 in proper relation to each other automatically.

In the operation of the device assuming the parts to be in position shown in Fig. 1 the die 30 is in operative position beneath the printing pad 26 and it is assumed that the said die has already been inked by previously coming in contact with the inking roller 37. When the eccentric 15 makes a half rotation the plunger 12 and the piston 16 will be moved down into the position shown in Fig. 5 bringing the pad 26 into pressing engagement with the die 30, the elastic composition of the pad allowing it to be pressed into the intaglio depressions in the die so as to take up the ink therefrom and then during the continued movement of the eccentric the plunger and piston will be raised again into the position shown in Fig. 1. During the downward movement of the plunger and piston just previously described, the lever 23 will drop down by gravity into the position shown in Fig. 5 and the spring 18 will remain expanded. The downward movement of the lever 23, however, is merely incidental at this stage and has no function. When the piston and plunger rise, the lever 23 will resume its normal position as shown in Fig. 1. Now the carrier will be moved to the right to carry the die out from under the plunger and to bring the work holder 31 into alinement beneath the plunger. During this last movement of the carrier the die will be carried underneath the wiper and underneath the inking roller 37 where it will receive ink for a new impression. The lever 23 will then be depressed manually into the position shown in Fig. 6, to bring the piston down and press the printing pad 26 against the work 40 on the holder with sufficient force to print the design on the work. There should be a dwell of the carrier 29 during this downward movement of the piston. The lever 23 will then be released and the spring 18 will raise the piston. It is to be understood that during this manual operation of the piston the plunger will remain in its elevated position. The operating mechanism for the carriers is so timed that the carrier shall then move to the left, bring the die back under the piston and the work holder out from under the piston, then the plunger will be actuated to cause the plunger and piston to move down and press the printing pad 26 against the die to again take up the ink from the die. During this operation the operator will remove from the holder the work already printed and place on the work holder a fresh piece of work ready for the next forward movement of the work holder when the die moves out from under the plunger.

In the modified form of means shown in Fig. 8 for operating the piston 16, the piston is provided with a rack 41 which is engaged by a sector gear 42 rigidly connected with the lever 43. The sector gear and lever are mounted on a shaft 44 journalled in the frame and the sector gear extends through an elongated slot 45 in the hollow plunger.

What I claim is:

1. In a machine of the character described, a die containing the design to be printed, a movable piston having at its lower end a yielding printing surface adapted to be pressed into engagement with the die to take up ink therefrom, a vertically movable plunger in which said piston is mounted, yielding connection between the plunger and piston whereby when the plunger moves the piston will be carried therewith, a reciprocable die carrier and a reciprocable work carrier, means for alternately bringing the die carrier and the work carrier beneath the piston, means for reciprocating the plunger together with the piston when the die is positioned beneath the piston and thereby causing the printing surface of the piston to be pressed into contact with the die, and means for reciprocating the piston independently of the plunger whereby when the work is positioned beneath the piston the printing surface thereof may be pressed into engagement with the work.

2. In a machine of the character described, a die containing the design to be printed, a vertically movable piston having on its lower end a yielding printing surface adapted to be pressed into engagement with the die to take up a printing substance therefrom, a vertically movable hollow plunger in which said piston is mounted, yielding connection between the plunger and piston whereby when the plunger moves the piston will be carried thereby, a reciprocable die carrier and a reciprocable work carrier, means for alternately bringing the die carrier and work carrier beneath the piston, means for reciprocating the plunger and piston when the die is positioned beneath the piston and thereby causing the printing surface of the piston to be pressed into contact with the die, and means for reciprocating the piston independently of and with relation to the plunger whereby when the work is positioned beneath the piston the printing surface thereof will be pressed into engagement with the work.

3. In a machine of the character described, a vertically movable member carrying a printing surface adapted to engage with a die to take up a printing substance therefrom, a reciprocable die carrier and a reciprocable work carrier, means for reciprocating the die carrier so that movement in one direction will bring the die beneath the printing member and movement in the reverse direction will carry the die out from under the printing member, a spring adapted to move the work carrier to a position beneath the printing member when the die carrier is moved out from beneath the printing member, said die carrier while under the printing member acting as a stop to prevent the work carrier from moving into such position, and being operative on its return movement to a position beneath the printing member to push the work holder out from beneath the printing member.

4. In a machine of the character described, a vertically reciprocable printing member, a horizontally reciprocable die carrier and a reciprocable work holder, a way in which said carriers are movable to bring the die and work holder alternately to a position beneath the vertically movable printing member, means for positively reciprocating the die carrier, a spring which moves the work carrier into position beneath the said printing member when the die carrier moves out from beneath the printing member, the die carrier being operative on its return movement to a position beneath the printing member to move the work holder out from its position beneath the printing member in opposition to the action of the spring and to thereby render the spring effective to again move the work carrier into the position vacated by the die carrier when the die carrier is moved out of position beneath the printing member.

5. In a machine of the character described, a vertically reciprocable member having a printing surface, a horizontally reciprocable die carrier and a horizontally reciprocable work carrier, a way on which said carriers are movable and means for reciprocating said carriers in such manner as to alternately bring the die carrier and the work carrier into position beneath the printing member, said carrier-actuating means being so constructed and arranged that when the die carrier moves away from the station beneath the printing member the work carrier will be moved into operative position and when the die carrier moves back into operative position beneath the printing member the work carrier will thereby be moved out of such position.

In testimony whereof I affix my signature.

ELIOT O'HARA.